(12) United States Patent
Shiba

(10) Patent No.: US 10,027,143 B2
(45) Date of Patent: Jul. 17, 2018

(54) VEHICLE

(71) Applicant: TOYOTA JIDOSHA KABUSHIKI KAISHA, Toyota-shi, Aichi-ken (JP)

(72) Inventor: Kenjiro Shiba, Takahama (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 9 days.

(21) Appl. No.: 15/208,077

(22) Filed: Jul. 12, 2016

(65) Prior Publication Data

US 2017/0018939 A1    Jan. 19, 2017

(30) Foreign Application Priority Data

Jul. 14, 2015  (JP) .................................. 2015-140552

(51) Int. Cl.
*H02J 7/00* (2006.01)
*B60L 11/18* (2006.01)
*H02M 3/07* (2006.01)

(52) U.S. Cl.
CPC ......... *H02J 7/0029* (2013.01); *B60L 11/1803* (2013.01); *B60L 11/1812* (2013.01); *B60L 11/1816* (2013.01); *H02J 7/0054* (2013.01); *H02M 3/07* (2013.01)

(58) Field of Classification Search
CPC .................................................. H02J 7/0029
USPC ....................................................... 320/109
See application file for complete search history.

(56) References Cited

U.S. PATENT DOCUMENTS

| 9,669,714 | B2 * | 6/2017 | Schneider | ............. | B60W 20/00 |
| 2005/0266740 | A1 * | 12/2005 | Kikuchi | .................. | H01R 4/44 |
| | | | | | 439/801 |
| 2014/0340095 | A1 | 11/2014 | Schneider | | |
| 2016/0303948 | A1 * | 10/2016 | Sakai | ..................... | B60L 1/003 |

FOREIGN PATENT DOCUMENTS

| JP | 2006-014577 A | 1/2006 |
| JP | 2006-136097 A | 5/2006 |
| JP | 2015-100241 A | 5/2015 |
| KR | 10-2010-0133836 A | 12/2010 |
| KR | 10-2014-0129152 A | 11/2014 |
| WO | 2015075883 A1 | 5/2015 |

* cited by examiner

*Primary Examiner* — Edward Tso
*Assistant Examiner* — Ahmed Omar
(74) *Attorney, Agent, or Firm* — Sughrue Mion, PLLC

(57) ABSTRACT

A vehicle includes: an inverter; a high-voltage connector and a low-voltage connector that are connected to the inverter; and a wire harness arranged at the rear of the inverter. The high-voltage connector includes fixing members that fix the high-voltage connector to the inverter, and the fixing members have release portions. The low-voltage connector includes an extended section, and the extended section extends toward the wire harness and covers the release portions. An upper surface of the extended section declines rearward, and an upper surface rear end of the extended section is located below a center in a cross section of the wire harness.

3 Claims, 4 Drawing Sheets

VEHICLE

INCORPORATION BY REFERENCE

The disclosure of Japanese Patent Application No. 2015-140552 filed on Jul. 14, 2015 including the specification, drawings and abstract is incorporated herein by reference in its entirety.

BACKGROUND

1. Technical Field

The present disclosure relates to a vehicle in which an inverter for supplying electric power to a motor for traveling (traveling motor) is mounted in a front space.

2. Description of Related Art

A vehicle that travels by using an electric motor includes an inverter that converts direct current (DC) power output from a high-voltage power supply to alternative current (AC) power and supplies the AC power to the electric motor. Examples of the high-voltage power supply are a battery and a fuel cell. The inverter is often mounted in a front space (a front compartment) of the vehicle. To simplify the description below, the electric motor will simply be referred to as the motor.

The inverter is provided with an interlock so as to prevent a person from accidentally touching a component in the inverter while a high voltage is applied thereto. Examples of the inverter that includes the interlock are disclosed in Japanese Patent Application Publication No. 2006-136097 (JP 2006-136097 A) and Japanese Patent Application Publication No. 2006-014577 (JP 2006-014577 A). With each of the interlocks that are disclosed in these publications, a cover of the inverter cannot be released unless the inverter is electrically shut off from a high-voltage battery. Also regarding a connector (a high-voltage connector) of a high-voltage power line that supplies the electric power from the high-voltage battery to the inverter, exposure of a terminal, to which the high voltage is applied, is unfavorable. Thus, some of the high-voltage connectors cannot be released unless the high-voltage connector is electrically shut off from the high-voltage battery.

Note that a voltage of 60 volts or higher is defined as the "high voltage" in the Federal Motor Vehicle Safety Standards (FMVSS) of the United States. Meanwhile, in the "Announcement that prescribes Details of the Safety Regulations for Road Vehicles (Oct. 28, 2011), Annex 111" of Japan, an operation voltage that is over 60 DC volts and 1500 DC volts or lower or that is over 30 AC volts (an effective value) and 1000 AC volts (an effective value) or lower is defined as the "high voltage".

By the way, the inverter that handles the high voltage also has components such as a control circuit that is operated by a low voltage. Thus, a connector (a low-voltage connector) of a low-voltage power line that supplies electric power from a low-voltage battery is connected to the inverter. That is, the high-voltage connector and the low-voltage connector are connected to the inverter. Here, the low voltage means a voltage that is lower than an output voltage of the high-voltage battery, and is typically 50 volts or lower.

Meanwhile, a large number of wire harnesses are arranged in a front space of the vehicle that travels by using the motor. Several wire harnesses are also arranged around the inverter. As one type of a layout, the wire harness is arranged at the rear of the inverter in such a manner as to extend in a vehicle width direction. Meanwhile, there is a case where such a structure is adopted in which the above-described low-voltage connecter is connected to an upper surface of the inverter while the high-voltage connector is connected to a rear surface of the inverter. In the cases where the vehicle with such a structure is involved in a frontal collision (or an oblique frontal collision) and the inverter moves rearward due to a shock during the collision, the low-voltage connector, which is connected to the upper surface of the inverter, is possibly caught by the wire harness and is possibly damaged.

SUMMARY

In this specification, attention is focused on a positional relationship between the high-voltage connector and the low-voltage connector that are described above and on a positional relationship between the inverter and the wire harness that is arranged in a direction of the inverter, and a technique that realizes an interlock of the high-voltage connector and protection of the low-voltage connector during a collision with a simple structure is provided.

In a vehicle that is disclosed in this specification, an inverter is mounted in a front space thereof. In the front space, a wire harness is arranged at the rear of the inverter in such a manner as to extend in a vehicle width direction. The inverter converts DC power that is output from a high-voltage power supply to AC power, and supplies the AC power to a traveling motor. A connector (a low-voltage connector) of a low-voltage power line that supplies electric power of a low-voltage power supply to the inverter is connected to an upper surface of the inverter. In addition, a connector (a high-voltage connector) of a high-voltage power line that supplies electric power of a high-voltage power supply is connected to a rear surface of the inverter. The vehicle further includes a shutoff circuit that electrically shuts off the high-voltage connector from the high-voltage power supply at a time when the low-voltage connector is released from the inverter. The low-voltage connector is provided with an extended section that extends rearward. The extended section covers release portions of fixing members that fix the high-voltage connector to the inverter. The extended section is arranged to extend toward the wire harness that is arranged at the rear of the inverter. An upper surface of the extended section declines rearward, and an upper surface rear end of the extended section is defined to be located below the center in a cross section of the wire harness.

With the above extended section, such a structure is realized that the high-voltage connector cannot be released unless the low-voltage connector is released. When the low-voltage connector is released, the high-voltage connector is electrically shut off from the high-voltage power supply by the shutoff circuit. Thus, the high-voltage connector can safely be released. The extended section that is provided in the low-voltage connector and the shutoff circuit function as an interlock. Meanwhile, when an inverter moves rearward due to a shock of a collision, the inverter hits a wire harness. At this time, a low-voltage connector that is connected to a upper surface of the inverter is possibly caught by the wire harness, and consequently, the low-voltage connector is possibly damaged or released. In the vehicle that is disclosed in this specification, due to a structural relationship between the extended section and the wire harness described above, the wire harness is guided by the inclined upper surface of the extended section and moves upward in the cases where the vehicle is involved in the collision and the inverter moves rearward. As a result, the low-voltage connector is prevented from being caught by the wire harness.

The above extended section of the low-voltage connector has the function of the interlock of the high-voltage connector and a function of protecting the low-voltage connector. With the simple structure of the extended section described above, the interlock of the high-voltage connector and protection of the low-voltage connector are realized.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
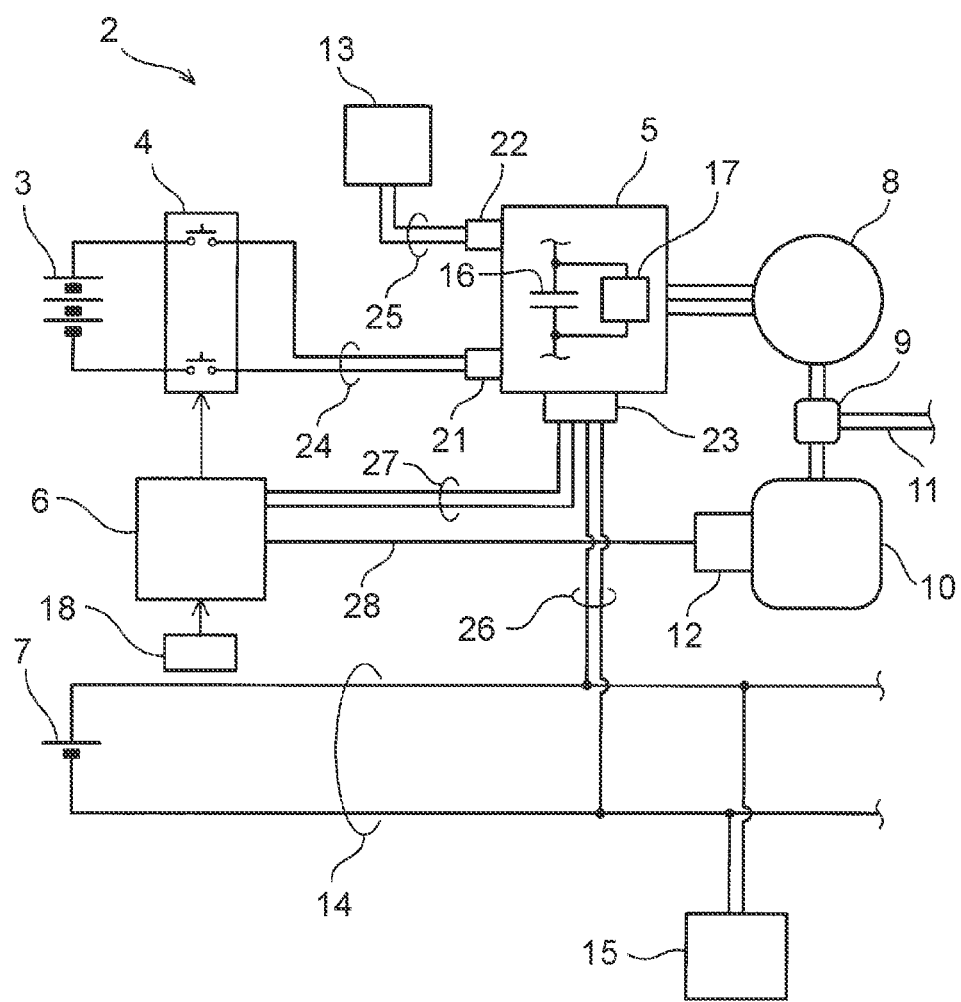
FIG. 1 is a block diagram of a vehicle in an embodiment.

A description will be made on a vehicle of an embodiment with reference to the drawings. FIG. 1 shows a block diagram of the vehicle. Note that components that are not necessary for the description of a technique disclosed in this specification are not shown in the block diagram in FIG. 1. The vehicle of the embodiment is a hybrid vehicle 2 that includes an electric motor 8 and an engine 10 for traveling. To simplify the following description, the electric motor 8 will simply be referred to as the motor 8. Output of the motor 8 and output of the engine 10 are combined by a power split mechanism 9 and output to an axle 11. In some cases, the power split mechanism 9 distributes output torque of the engine 10 to the axle 11 and the motor 8. At this time, the motor 8 generates electric power by using a portion of the output torque of the engine 10. The generated electric power (regenerative power) is accumulated in a high-voltage battery 3 via an inverter 5. An engine controller 12 is attached to a casing of the engine 10. The engine controller 12 is connected to an HV controller 6 that handles control of the entire vehicle by a wire harness 28. The wire harness 28 is a communication line through which various signals are exchanged between the HV controller 6 and the engine controller 12.

The motor 8 is driven by AC power that is supplied from the inverter 5. The inverter 5 converts DC power from the high-voltage battery 3 to the AC power that is suited for driving the motor 8 and supplies the AC power to the motor 8. Output of the high-voltage battery 3 is 60 volts or higher and is 300 volts, for example. The high-voltage battery 3 and the inverter 5 are connected by a first high-voltage power line 24. A first high-voltage connector 21 is provided at an end of the first high-voltage power line 24, and the first high-voltage connector 21 is connected to the inverter 5. That is, the first high-voltage power line 24 and the first high-voltage connector 21 supply the electric power from the high-voltage battery 3 to the inverter 5.

A system main relay 4 is provided in the middle of the first high-voltage power line 24. The system main relay 4 electrically shuts off the first high-voltage connector 21 from the high-voltage battery 3. More specifically, the system main relay 4 is a switch of a normal open type that shuts off between the high-voltage battery 3 and the first high-voltage connector 21 at a time when the electric power is not supplied to the system main relay 4 and that allows the electric power to flow between the high-voltage battery 3 and the first high-voltage connector 21 at a time when the electric power is supplied to the system main relay 4. The HV controller 6 controls conduction and shutoff by the system main relay 4. The control by the system main relay 4 will be described below.

An air conditioner 13 is also connected to the inverter 5 via a second high-voltage connector 22 and a second high-voltage power line 25. The air conditioner 13 is a device that is driven by an output voltage of the high-voltage battery 3. Regarding transmission of the electric power to the air conditioner 13, the inverter 5 simply relays the electric power of the high-voltage battery 3 that is transmitted via the first high-voltage power line 24 and the first high-voltage connector 21 to the second high-voltage connector 22 (the second high-voltage power line 25).

A control circuit that is driven by a low voltage is installed in the inverter 5. Here, the low voltage means a voltage that is lower than the above-described output voltage of the high-voltage battery 3. In order to supply the electric power to the control circuit, the inverter 5 is also connected to an auxiliary battery 7. An output voltage of the auxiliary battery 7 is lower than the output voltage of the high-voltage battery 3 and is 12 volts or 24 volts, for example. The inverter 5 and the auxiliary battery 7 are connected via an auxiliary machine common power line 14, a low-voltage power line 26, and a low-voltage connector 23. The low-voltage connector 23 is connected to one end of the low-voltage power line 26. The auxiliary machine common power line 14 is a power line that extends throughout the vehicle, and supplies low-voltage power to various auxiliary machines. The "auxiliary machines" is a collective term for a group of devices that is driven by the low voltage. One example of the auxiliary machines is a car navigation system 15. The control circuit, which is installed in the inverter 5 and driven by the low voltage, is also one of the auxiliary machines.

In addition to the low-voltage power line 26, a communication line 27 is connected to the low-voltage connector 23. The communication line 27 is provided to exchange various signals between the inverter 5 and the HV controller 6. Needless to say, communication between the inverter 5 and the HV controller 6 is cut off when the low-voltage connector 23 is released from the inverter 5.

As described above, the system main relay 4 is controlled by a command from the HV controller 6. When a main switch of the vehicle is turned on, the HV controller 6 sends a command of closing the relay to the system main relay 4. With this command, the system main relay 4 is closed. That is, the high-voltage battery 3 and the first high-voltage connector 21 are electrically connected. As a result, high-voltage power of the high-voltage battery 3 is supplied to the inverter 5. The HV controller 6 constantly monitors whether the communication with the inverter 5 can be made. As described above, when the low-voltage connector 23 is released from the inverter 5, the HV controller 6 can no longer communicate with the inverter 5. When the communication with the inverter 5 is cut off, the HV controller 6 sends a command of opening the relay to the system main relay 4. As a result, the system main relay 4 is opened, and the first high-voltage connector 21 is electrically shut off from the high-voltage battery 3. Then, a supply of the high-voltage power to the inverter 5 is stopped. The HV controller 6 and the system main relay 4 are one example of a shutoff circuit that electrically shuts off the first high-voltage connector 21 from the high-voltage battery 3 at a time when the low-voltage connector 23 is released from the inverter 5.

The inverter 5 is provided with a capacitor 16 that smoothes a current from the high-voltage battery 3. The inverter 5 is also provided with a discharge circuit 17 that discharges the electric power from the capacitor 16 during a vehicle collision. The voltage of the high-voltage battery 3 is applied to the capacitor 16, and the discharge circuit 17 discharges the electric power from the capacitor 16 during the collision. In this way, safety of the inverter 5 is secured. The discharge circuit 17 is also one type of the auxiliary machines and is operated by using the electric power from the auxiliary battery 7. An airbag controller 18 is connected to the HV controller 6. The airbag controller 18 includes an acceleration sensor that detects the collision. When detecting the collision, the airbag controller 18 notifies the HV controller 6 of the collision. When receiving a signal that notifies of the collision, the HV controller 6 sends a command of opening the relay to the system main relay 4 and also sends a command of discharging the electric power from the capacitor 16 to the inverter 5 via the communication line 27. In the case where the electric power of the auxiliary battery 7 keeps being supplied to the inverter 5 during the collision, the inverter 5 can discharge the electric power from the capacitor 16 on the basis of the command from the HV controller 6.

Figure 2:
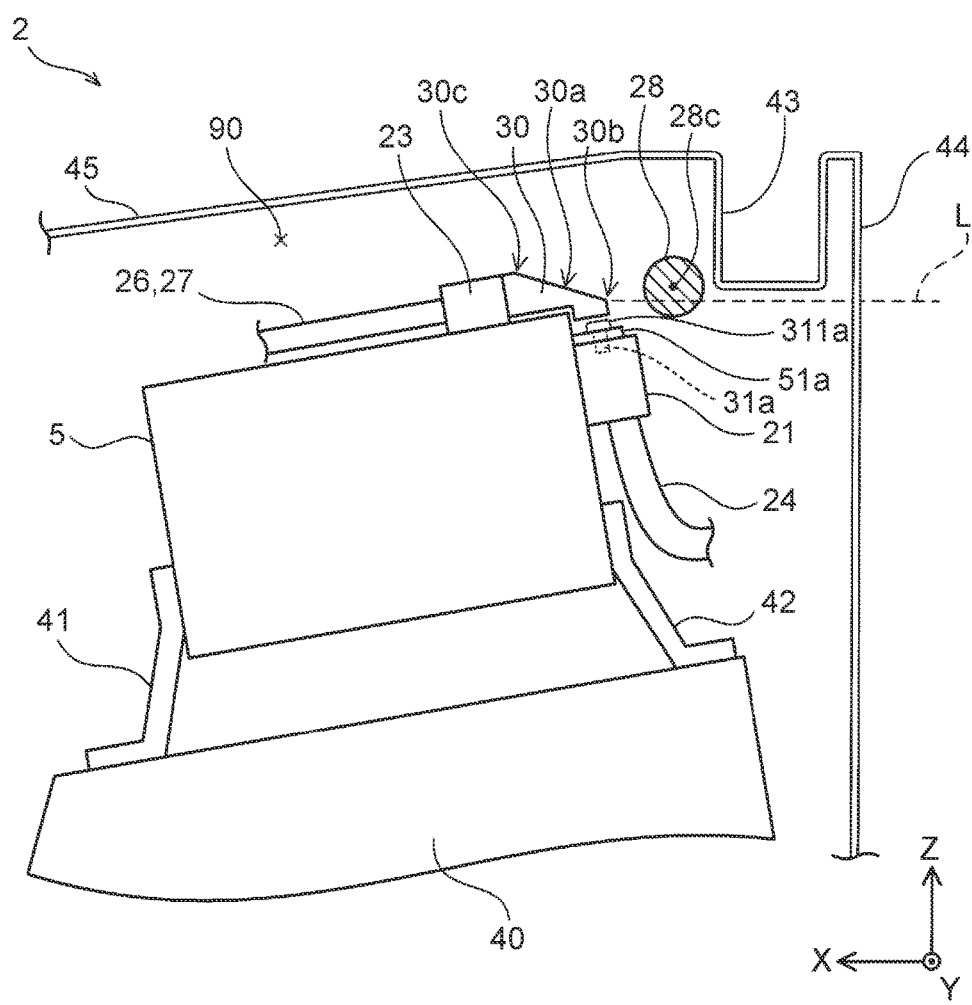
FIG. 2 is a side view of a periphery of an inverter in a front space of the vehicle.
Figure 3:
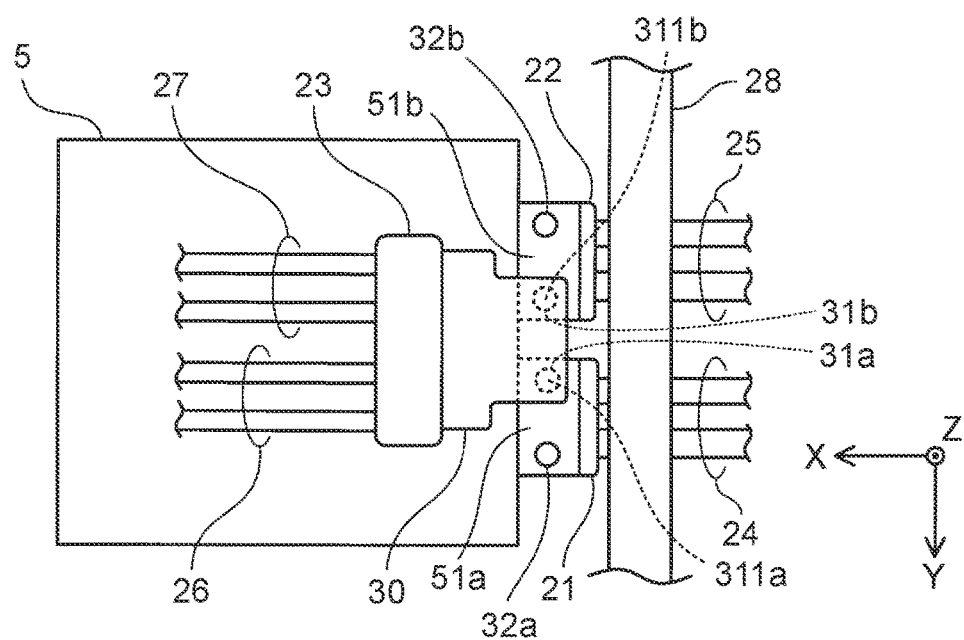
FIG. 3 is a top view of the periphery of the inverter in the front space.

A layout around the inverter 5 will be described with reference to FIG. 2 and FIG. 3. The inverter 5 is mounted in a front compartment 90 (a front space) of the hybrid vehicle 2. FIG. 2 is a side view that shows a component layout around the inverter 5 in the front compartment 90. FIG. 3 is a top view that shows the component layout around the inverter 5. A positive direction of an X-axis in each of the drawings corresponds to the front of the vehicle. A positive direction of a Z-axis corresponds to an upper side of the vehicle. The "front" in this specification means a front side of the vehicle, and "rear" means a rear side of the vehicle. In FIG. 2 and FIG. 3, some of the components that are installed in the front compartment 90 are not shown. Although a transaxle 40 is shown in FIG. 2, the transaxle 40 is not shown in FIG. 3.

In the front compartment 90, the inverter 5 is fixed on the transaxle 40. In addition to a gear group that constitutes the power split mechanism 9, which has been described by using FIG. 1, the motor 8 is installed in the transaxle 40 of the hybrid vehicle 2. In addition, the transaxle 40 is coupled to the engine 10. Due to significant vibrations, the transaxle 40 and the engine 10 are suspended by two side members (not shown) of the vehicle via an engine mount (not shown) for blocking the vibrations. In order to block the vibrations from the transaxle 40, the inverter 5 is supported by two brackets with anti-vibration bushes (a front bracket 41 and a rear bracket 42). The inverter 5 is supported by the front bracket 41 and the rear bracket 42 with a gap being provided from the transaxle 40.

The low-voltage connector 23 is connected to an upper surface of the inverter 5. In addition, the first high-voltage connector 21 and the second high-voltage connector 22 are connected to a rear surface of the inverter 5. As described by using FIG. 1, the low-voltage connector 23 is a connector for connecting the low-voltage power line 26, which supplies the electric power from the auxiliary battery 7, to the inverter 5. The first high-voltage connector 21 is a connector for connecting the first high-voltage power line 24, which supplies the electric power from the high-voltage battery 3, to the inverter 5. The second high-voltage connector 22 is a connector for connecting the second high-voltage power line 25, which supplies the high-voltage power from the inverter 5 to the air conditioner 13, to the inverter 5.

The communication line 27 is also connected to the low-voltage connector 23. As described by using FIG. 1, a tip of the communication line 27 is connected to the HV controller 6, and the inverter 5 and the HV controller 6 communicate with each other via the communication line 27. Once the low-voltage connector 23 is released from the inverter 5, the communication between the HV controller 6 and the inverter 5 is cut off. The HV controller 6 constantly monitors the communication with the inverter 5, and once the communication with the inverter 5 is cut off, the HV controller 6 sends the command of opening the relay to the system main relay 4. Then, the system main relay 4 is opened, and the first high-voltage power line 24 is shut off. That is, the first high-voltage connector 21 is electrically shut off from the high-voltage battery 3. In other words, when the low-voltage connector 23 is released from the inverter 5, electrical shutoff between the high-voltage battery 3 and the first high-voltage connector 21 is secured. As a result, the supply of the high-voltage power to the inverter 5 is cut off. The electric power is supplied from the high-voltage battery 3 to the air conditioner 13 through the inverter 5. Accordingly, when the low-voltage connector 23 is released from the inverter 5, the supply of the high-voltage power to the air conditioner 13 is also stopped.

The first high-voltage connector 21 is fixed to the rear surface of the inverter 5 by two bolts 31a, 32a. The second high-voltage connector 22 is fixed to the rear surface of the inverter 5 by two bolts 31b, 32b. FIG. 2 is the side view of the inverter 5; the bolt 32a is not shown but the bolt 31a is shown. The bolts 31a, 32a penetrate a rib 51a that is projected from the rear surface of the inverter 5 from an upper side to a lower side and fix the first high-voltage connector 21 that is located on the lower side of the rib 51a. Similarly, the bolts 31b, 32b penetrate a rib 51b that is projected from the rear surface of the inverter 5 from an upper side to a lower side and fix the second high-voltage connector 22 that is located on the lower side of the rib 51b.

An extended section 30 extends from the low-voltage connector 23. The extended section 30 extends rearward from the low-voltage connector 23 along the upper surface of the inverter 5. A rear portion of the extended section 30 is projected rearward from a rear end of the inverter 5 and covers a bolt head 311a of the bolt 31a that fixes the first high-voltage connector 21 and a bolt head 311b of the bolt 31b that fixes the second high-voltage connector 22. Accordingly, in order to release the bolts 31a, 31b, first, the low-voltage connector 23 has to be released from the inverter 5. That is, in order to release the first and second high-voltage connectors 21, 22 from the inverter 5, first, the low-voltage connector 23 has to be released from the inverter 5.

As described above, when the low-voltage connector 23 is released from the inverter 5, the first high-voltage connector 21 is electrically shut off from the high-voltage battery 3, and the supply of the high-voltage power to the inverter 5 is reliably stopped. Thus, the first and second high-voltage connectors 21, 22 can safely be released from the inverter 5. When the low-voltage connector 23 is released from the inverter 5, the supply of the high-voltage power to the air conditioner 13 is also reliably stopped. Thus, the air conditioner 13 can safely be handled.

Just as described, with the extended section 30 that is provided in the low-voltage connector 23, the first and second high-voltage connectors 21, 22 cannot be released until the low-voltage connector 23 is released. In addition, when the low-voltage connector 23 is released, the first high-voltage connector 21 is electrically shut off from the high-voltage battery 3, and the supply of the high-voltage power to the inverter 5 is reliably stopped. Accordingly, the extended section 30 and the shutoff circuit described above (the HV controller 6 and the system main relay 4) realize an interlock of the inverter 5.

As shown in FIG. 2, an upper surface 30a of the extended section 30 declines rearward. The wire harness 28 is located at the rear of the low-voltage connector 23, that is, at the rear of the extended section 30. The wire harness 28 extends in a vehicle width direction. Note that, in FIG. 2, only the wire harness 28 is hatched and shown in a cross section that passes through the extended section 30 and is orthogonal to the vehicle width direction (a Y-axis direction). Note that a positional relationship between the inverter 5 and the wire harness 28 can be expressed as follows. That is, in the front compartment 90 of the hybrid vehicle 2, the inverter 5 is mounted in front of the wire harness 28 that extends in the vehicle width direction.

As described above, the wire harness 28 is the communication line that connects the HV controller 6 and the engine controller 12. In addition, a cowl 43 is located at the rear of the wire harness 28. The cowl 43 is a part of a vehicle body and is a structure that accommodates windshield wipers (not shown) and the like. Note that a reference numeral 45 denotes a front compartment hood and a reference numeral 44 denotes lower dash panel. The lower dash panel 44 is a divider that divides the front compartment 90 and a vehicle cabin.

A broken line L shown in FIG. 2 is an auxiliary line on the drawing that extends horizontally to the rear from a rear end (an upper surface rear end 30b) of an upper surface 30a of the extended section 30. As shown in FIG. 2, a center 28c in a cross section of the wire harness 28 is located above the auxiliary line L. That is, the upper surface rear end 30b of the extended section 30 is located below the center 28c of the wire harness 28 in the cross section in FIG. 2. The "cross section in FIG. 2" is the cross section that passes through the extended section 30 and is orthogonal to the vehicle width direction (the Y-axis direction).

Meanwhile, a front end (an upper surface front end 30c) of the upper surface 30a of the extended section 30 is the highest position of the low-voltage connector 23. As shown in FIG. 2, the low-voltage power line 26 and the communication line 27 are connected to a front surface of the low-voltage connector 23, and connected positions of the low-voltage power line 26 and the communication line 27 with the low-voltage connector 23 are lower than the upper surface front end 30c. Characteristics of the upper surface 30a of the extended section 30 are summarized as follows. The upper surface 30a of the extended section 30 declines rearward. The upper surface rear end 30b is located below the center 28c in the cross section of the wire harness 28. The upper surface front end 30c is the highest position of the low-voltage connector 23 that is connected to the inverter 5, and is located higher than a wire harness (the low-voltage power line 26 and the communication line 27) that is connected to the low-voltage connector 23.

A description will be made on advantages of inclination of the upper surface 30a of the extended section 30. The inverter 5 is arranged in the front compartment 90 and is supported on the transaxle 40 by the front bracket 41 and the rear bracket 42. The low-voltage connector 23 is connected to the upper surface of the inverter 5, and the wire harness 28 extends in the vehicle width direction at the rear of the inverter 5. When the vehicle is involved in a frontal collision (or an oblique frontal collision), there is a case where an obstacle invades the front compartment from the front, hits the inverter, and makes the inverter move rearward. In such a case, the low-voltage connector hits the wire harness. Because the cowl is located at the rear of the wire harness, the wire harness can only move slightly to the rear from a current position. Accordingly, the low-voltage connector of the inverter, which moves rearward, is possibly caught by the wire harness, and the low-voltage connector is possibly damaged. Depending on a case, the low-voltage connector is released from the inverter. However, in the hybrid vehicle 2 of the embodiment, the upper surface 30a of the extended section 30 of the low-voltage connector 23 declines rearward, and the upper surface rear end 30b is located below the center 28c in the cross section of the wire harness 28. In addition, the upper surface front end 30c is the highest position of the low-voltage connector 23. The wire harness (the low-voltage power line 26 and the communication line 27) that is connected to the low-voltage connector 23 is located below the upper surface front end 30c. Due to this structure, when the inverter 5 moves rearward, the wire harness 28 rides on the inclined upper surface 30a and moves upward. The low-voltage connector 23 passes under the wire harness 28, and thus is prevented from being caught by the wire harness 28. In this way, the low-voltage connector 23 is protected from hitting the wire harness 28.

Figure 4:
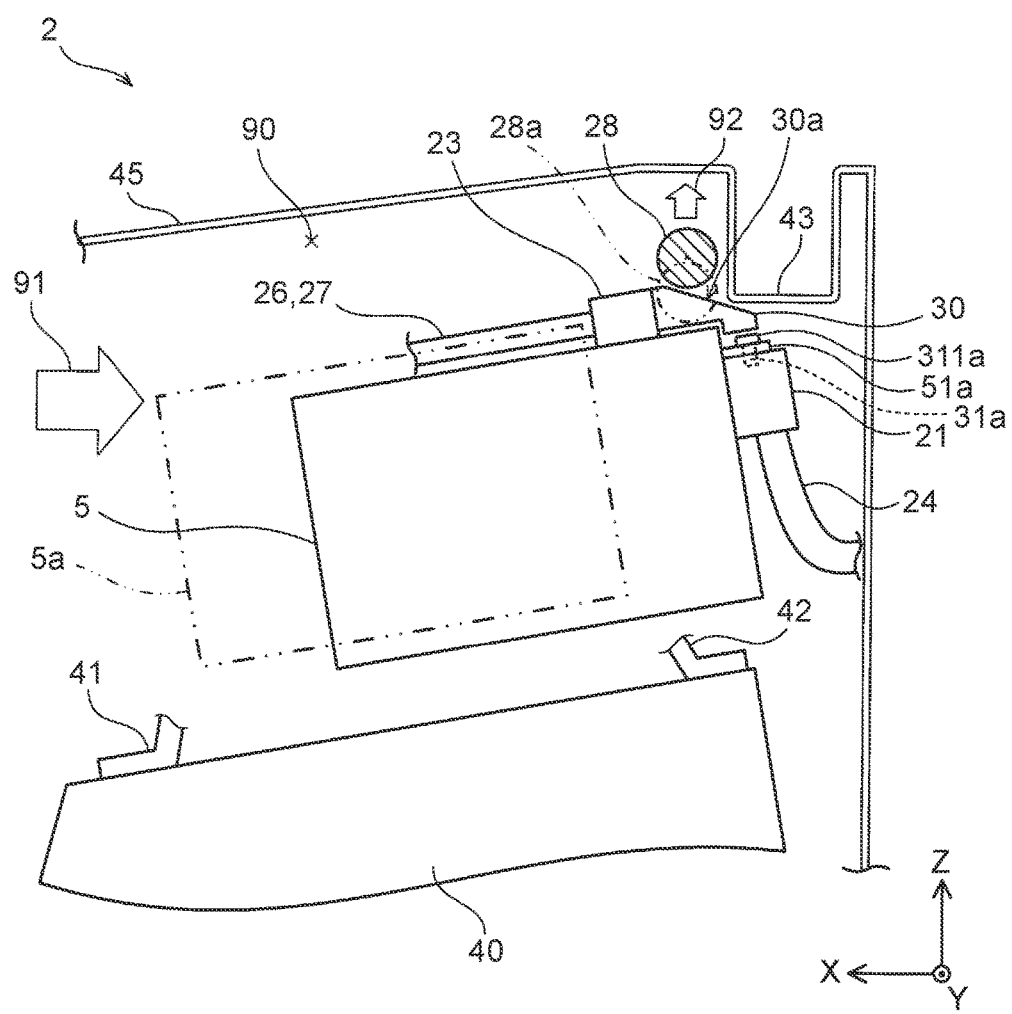
FIG. 4 is a side view of the periphery of the inverter in the front space (at a time when the inverter moves rearward).

FIG. 4 shows a positional relationship between the extended section 30 and the wire harness 28 at a time when the inverter 5 moves rearward. In FIG. 4, the front bracket 41 and the rear bracket 42 that are deformed by the collision are not shown. A rectangular shape that is drawn by virtual lines and denoted by a reference numeral 5a indicates a position of the inverter 5 before the collision. A circle that is drawn by a virtual line and denoted by a reference numeral 28a indicates the wire harness before the collision. An arrow denoted by a reference numeral 91 indicates an input direction of a collision shock. The inverter 5 moves rearward due to this collision shock. An arrow denoted by a reference numeral 92 indicates a moving direction of the wire harness 28. FIG. 4 shows a circumstance where the extended section 30 moves rearward to a position of the wire harness 28a before the collision, and consequently, the wire harness 28 moves onto the upper surface 30a. Because the wire harness 28 moves upward during the collision, the wire harness 28 is prevented from being severely hit by the low-voltage connector 23. Thus, damage to the wire harness 28 can also be prevented.

In the hybrid vehicle 2 of the embodiment, the extended section 30 that serves as a part of the interlock has a connector protecting function during the collision. In the hybrid vehicle 2 of the embodiment, a structure of the extended section 30 as a simple component is given a new twist so as to realize an interlock function and the connector protecting function during the collision.

In addition, the inverter 5 includes: the capacitor 16 that smoothes the current supplied from the high-voltage battery 3; and the discharge circuit 17 that discharges the electric power from the capacitor 16 at the time when the hybrid vehicle 2 is involved in the collision. The discharge circuit 17 is operated by the electric power that is supplied from the auxiliary battery 7 via the low-voltage connector 23. In the cases where the low-voltage connector 23 is damaged (or released from the inverter 5) during the collision and the supply of the electric power thereto is stopped, the electric power can no longer be discharged from the capacitor 16.

Just as described, the low-voltage connector 23 plays an important role during the collision. In the hybrid vehicle 2 of the embodiment, the low-voltage connector 23 is protected during the collision. Thus, the electric power can reliably be discharged from the capacitor 16 during the collision.

The important point to note about the technique that has been described in the embodiment will be described. The high-voltage battery 3 is one example of the "high-voltage power supply". The auxiliary battery 7 is one example of the "low-voltage power supply". The first high-voltage power line 24 is one example of the "high-voltage power line that supplies the electric power from the high-voltage battery". The bolts 31a, 31b are one example of the "fixing member that fixes the high-voltage connector to the high-voltage device". Each of the bolt heads 311a, 311b of the bolts 31a, 31b is one example of the "release portion of the fixing member". The "release portion of the fixing member" may be a nut of the bolt that fixes the high-voltage connector to the high-voltage device.

In the hybrid vehicle 2 of the embodiment, the upper surface rear end 30b of the extended section 30 is located on the lower side of the center 28c in the cross section of the wire harness 28 in FIG. 2. In the cases where such a positional relationship is realized, the inverter 5 moves rearward, and the extended section 30 hits the wire harness 28, the wire harness 28 moves in such a manner as to ride on the upper surface 30a of the extended section 30, is thereafter guided by the slope of the upper surface 30a, and moves upward. The low-voltage connector 23 passes under the wire harness 28. Thus, the low-voltage connector 23 is prevented from severely hitting the wire harness 28. Note that, in order to further reliably mitigate the shock during the hit of the low-voltage connector 23 with the wire harness 28, the upper surface rear end 30b of the extended section 30 is desirably located on a lower side of a lower end of the wire harness 28.

Here, the embodiment is summarized. The inverter 5 is mounted in the front space of the hybrid vehicle 2. The low-voltage connector 23 is connected to the upper surface of the inverter 5, and the first high-voltage connector 21 is connected to the rear surface thereof. The wire harness 28 is arranged at the rear of the inverter 5. The low-voltage connector 23 is provided with the extended section 30 that extends toward the wire harness 28. The extended section 30 covers the head of the bolt 31a that fixes the first high-voltage connector 21 to the inverter 5. The upper surface 30a of the extended section 30 declines rearward, and the upper surface rear end 30b is located below the center 28c in the cross section of the wire harness 28.

The technique disclosed in this specification can be applied to vehicles, each of which travels by using an electric motor. Such vehicles include, in addition to the hybrid vehicle, an electric vehicle that does not have an engine and a vehicle in which a traveling electric motor is driven by a fuel cell.

The embodiment has been described so far in detail; however, this is merely illustrative and has no intention of limiting the claims. The techniques that are described in the claims include various modifications and changes that are made to the embodiment illustrated so far. Technical elements that are described in this specification and the drawings demonstrate technical utility when used singly or in various combinations, and thus are not limited to the combinations described in the claims in the original application. In addition, the techniques that are illustrated in this specification and the drawings can achieve a plurality of purposes simultaneously and demonstrate the technical utility by achieving one purpose thereof itself.

What is claimed is:

1. A vehicle comprising:
    a high-voltage power supply;
    a low-voltage power supply;
    a traveling motor;
    an inverter mounted in a front space of the vehicle, the inverter configured to convert direct current power that is output from the high-voltage power supply to alternative current power and supply the alternative current power to the traveling motor;
    a wire harness arranged at a rear of the inverter, the wire harness extending in a vehicle width direction;
    a high-voltage power line configured to supply electric power of the high-voltage power supply to the inverter, the high-voltage power line including a high-voltage connector, the high-voltage connector connected to a rear surface of the inverter that faces a rear of the vehicle, the high-voltage connector including fixing members that fix the high-voltage connector to the inverter, and the fixing members having release portions;
    a low-voltage power line configured to supply electric power of the low-voltage power supply to the inverter, the low-voltage power line including a low-voltage connector, the low-voltage connector being connected to an upper surface of the inverter, the low-voltage connector including an extended section, the extended section that extends toward the wire harness, the extended section that covers the release portions, an upper surface of the extended section that declines rearward, and an upper surface rear end of the extended section being located below a center in a cross section of the wire harness; and
    a shutoff circuit configured to electrically shut off the high-voltage connector from the high-voltage power supply when the low-voltage connector is released from the inverter.

2. The vehicle according to claim 1, wherein the inverter includes:
    a capacitor configured to smooth a current that is supplied from the high-voltage power supply; and
    a discharge circuit configured to discharge electric power from the capacitor when the vehicle is involved in a collision, the discharge circuit being configured to be operated by the electric power that is supplied via the low-voltage connector.

3. The vehicle according to claim 1, wherein an imaginary horizontal line extending from the upper surface rear end the wire harness extends through the wire harness; and the upper surface of the extended section that declines rearward is inclined; and, upon movement of the inverter rearward due to a shock during a collision, the wire harness is pushed upward by the inclined upper surface of the extended section.

* * * * *